United States Patent [19]

Schwarz

[11] 4,209,482

[45] Jun. 24, 1980

[54] METHOD OF PRODUCING SHAPED BODIES OF REINFORCED SYNTHETIC RESIN

[76] Inventor: Walter Schwarz, Engerthstr. 237b, Wien, Austria, A 1020

[21] Appl. No.: 931,014

[22] Filed: Aug. 4, 1978

[30] Foreign Application Priority Data

Aug. 5, 1977 [AT] Austria ................................ 5779/77
Feb. 24, 1978 [AT] Austria ................................ 1370/78

[51] Int. Cl.² .......................... B29C 11/00; B29G 7/00
[52] U.S. Cl. ..................................... 264/135; 264/137; 264/221; 264/347
[58] Field of Search ............... 264/136, 137, 221, 317, 264/236, 334, 347, 255, 134, 135, DIG. 44; 249/61, 62; 156/155

[56] References Cited

U.S. PATENT DOCUMENTS

| 2,744,043 | 5/1956 | Ramberg | 156/155 |
| 3,113,897 | 10/1963 | Hönningstad et al. | 264/317 |
| 3,198,868 | 8/1965 | Pedretti et al. | 264/236 |
| 3,255,284 | 6/1966 | Meislohn | 264/236 |
| 4,056,596 | 11/1977 | Pahl | 264/221 |

FOREIGN PATENT DOCUMENTS 944955 12/1963 United Kingdom .

*Primary Examiner*—W. E. Hoag
*Attorney, Agent, or Firm*—Karl F. Ross

[57] ABSTRACT

Synthetic resin bodies reinforced with fiber, roving or the like can be made, in accordance with the invention, by impregnating the reinforcing material with synthetic resin and then casting a hardenable liquid around the resulting body to form a mold in situ therefor. The synthetic resin material is thus permitted to harden in the solidified mold material whereupon the mold material is removed.

12 Claims, 6 Drawing Figures

METHOD OF PRODUCING SHAPED BODIES OF REINFORCED SYNTHETIC RESIN

FIELD OF THE INVENTION

The present invention relates to a method of producing shaped bodies of reinforced synthetic-resin material. More particularly, the invention relates to the production of reinforced synthetic-resin bodies which can have intricate shapes and without the costs incumbent upon the preparation of correspondingly complicated molds.

BACKGROUND OF THE INVENTION

Bodies of hardenable synthetic-resin materials, such as polyesters, epoxy resins and like thermosetting materials are commonly reinforced with fibers or fabric (textile) structures of glass filaments, synthetic-resin fibers or metal strands.

Such bodies have been made heretofore either by the so-called wet process or by the so-called dry process.

In the wet process, the synthetic-resin impregnated fibers, e.g. in the form of roving, can be coiled upon a core having an outer profile corresponding to the inner profile of the body to be fabricated.

When staple fibers are used as the reinforcing material, the impregnated fibers can be sprayed upon a mold wall.

In the case of reinforcing fiber webs of woven or nonwoven fibrous material, the latter can be impregnated with the synthetic-resin material and applied to the form or mold wall or to a previous layer of the impregnated fibers applied to such a wall. Rolling or like compaction can then be carried out to ensure complete freedom of the layer from air bubbles.

The aforementioned compaction, densification or compression, in all cases to ensure freedom from trapped air bubbles, is generally of limited applicability as the body shape becomes more complex and is frequently uncontrolable so that uniform-quality bodies cannot be produced economically by these techniques.

In the dry process, the fibers are first applied to the mold, i.e. given the desired shape, for example, by coiling them upon a mold core, whereupon they are impregnated with the synthetic-resin material.

In order to ensure a high density and thus freedom from air bubbles in the latter case, it is a common practice to apply the fiber coils to the mold core and to set the latter in a mold cavity which is then evacuated, filled with the synthetic-resin material, pressurized to press the synthetic-resin material into the interstices of the fiber, and the synthetic-resin material is permitted to harden.

While this technique has been found to give rise to shaped bodies which are practically completely free from air bubbles and have a high density, the disadvantage of this process is that expensive molds must be used both because the mold must be vacuum and pressure tight and provided with feed and discharge lines, but also because the hardening time of the synthetic-resin material may be relatively long. For a given output rate, therefore, industrial production by this technique requires, as a rule, a multiplicity of expensive molds.

OBJECTS OF THE INVENTION

It is an important object of the present invention to provide a method of making shaped hardenable synthetic-resin bodies in which the mold structures are relatively inexpensive and yet give rise to high-quality reproducible products.

It is also an object of the invention to provide an improved method of producing reinforced synthetic-resin bodies of complex configuration in a particularly convenient and economical and reproducible manner, free from the disadvantages of the earlier systems described above.

SUMMARY OF THE INVENTION

These objects and others which will become apparent hereinafter are attained, in accordance with the present invention, by first forming a resin-impregnated reinforcing-fiber body with the hardenable synthetic resin in a liquid or nonhardened state, surrounding the resulting body closely with a liquid which forms in situ the mold cavity for the body of the ultimate shape to be produced, hardening this liquid and thereafter effecting gelafication or hardening of the synthetic resin within the mold formed by the hardened body. Only after the synthetic-resin material has set, gelled or hardened, is the previously liquid material removed and the synthetic-resin body withdrawn therefrom.

The mold, in the case of the present invention, can thus be formed repeatedly from a reusable material in situ and, to the extent that it is transformed into a solid state, is capable of withstanding the vacuum or pressure which may be applied.

The mold-forming liquid thus lies in a force-sustaining and automatic manner in even the most complicated configuration against the reinforcement body and sheaths the latter completely and without crevices or gaps.

The use of this liquid, which solidifies and sustains the body during the hardening of the synthetic-resin material, completely eliminates the previously required expensive, high-tolerance, divided impregnating molds of conventional design.

The removal of the mold body can be effected, in accordance with the present invention, without difficulty or damage to the molded synthetic-resin body as soon as it becomes shape-retentive and rigid.

Because the sheath formed from the liquid, preferably by casting under pressure, closely surrounds the impregnated body of reinforcing material and because the solidification of the liquid results, as a consequence of shrinkage, upon an increased pressure upon the synthetic-resin impregnated reinforcement, it has been found to be possible to use a higher proportion of the reinforcement material in the body to be made and to subject the latter to higher vacuum and/or pressure than has hitherto been the case. As a consequence, the resulting synthetic-resin body can have a significantly higher compressive or tensile strength than has been possible heretofore and a more uniform and complete penetration of the body of reinforcement material with the synthetic resin.

The process of the present invention has been designated, for short, the MDK process as a consequence of the sequence of steps. This designation is an acronym for Materie Wandlungs-Druck/Vacuum-Injections-Kunststoffbindeverfahren. In English, this translates as "material transformation-pressure/vacuum-injection-synthetic-resin bonding process."

The process sequence can be programmed and carried out automatically using conventional automation techniques for the mass production or serial production of bodies regardless of their configurations and individually, sequentially or simultaneously with reproducibly high quality in a closed system. This ensures the safety and health of the working personnel and the plant since operating personnel never are subjected to toxic, noxious or detrimental vapors.

The reinforcement bodies which can be used in accordance with the present invention are thus surrounded by form-fitting, pressure-resistant, temperature-resistant, thick mold sheaths or shells in both the solid or liquid states and which are undivided so that they do not allow gaps with the detrimental results resulting from gaps between mold parts. To the extent that the sheath is solid, it can be removed after solidification and hardening of the shaped synthetic-resin body by any conventional technique such as melting, dissolution or solubilization or cutting. The material of the sheath is always reusable.

While the sheath can be formed from various inorganic and organic liquids, preferably those which are capable of solidification, to the extent that they are nonreactive with the synthetic resin and nonmiscible therewith, it has been found that best results are obtained when the sheath is formed from low-melting metal alloys. These metal alloys not only give an especially high density and mass to the solidifying liquid, but they contact the shaped reinforcing material in a particularly desirable manner and penetrate well into crevices or complex contours of the body. This allows reinforced synthetic-resin bodies of extremely complex nature to be readily produced.

The alloys are readily solidifiable by simple reduction of temperature, e.g. cooling, and result in highly pressure-resistant one-piece forms without complicated multipartite members and with complete avoidance of the separating crack problem resulting when multipart forms are used. A high degree of compaction of the material within the mold can thus be employed.

The liquid forming the sheath is, as noted, preferably a low-melting alloy whose melting point lies below the hardening temperature of the hardenable synthetic resin. Such alloys are preferably eutectic mixtures containing bismuth, lead, tin, cadmium or antimony. By proper choice of the alloy, the desired melting point can be selected readily.

For example, bismuth-tin-lead-cadmium-indium alloys can have a melting point of about 47° C. Bismuth-lead-cadmium alloys, for example, have a melting point of about 92° C. Bismuth-tin-zinc alloys have a melting point of about 130° C. With tin-lead-cadmium alloys, the melting point is about 145° C. and a melting point of 221° C. can be achieved with tin-silver alloys. With cadmium-antimony alloys, according to the invention, the melting point is 292° C.

The positioning of the reinforcing body for casting of the liquid sheathing material therearound can be effected by any conventional spacer, positioning frame or support of rigid material which is resistant to the sheathing material and to the temperatures thereof.

The reinforcing material can be fiber rovings, staple fibers, fabrics, wires, flocks or nonwoven fabrics, whiskers or the like (e.g. dendrites) of synthetic resin, glass, natural textile materials, carbon (graphite), asbestos or metal. When metal reinforcements are used, they are preferably of steel or beryllium. These materials can be used in any conventional form provided their interstices can be penetrated by the synthetic resin which is hardenable or thermosetting.

The reinforcing materials can be applied by coiling, spraying or electrostatic adhesion to a core or any other base.

The base can be a member which is retained in the hardened synthetic-resin body, or a quasi or lost falsework, for example, of reinforced synthetic-resin material, any other liner or the like. A lost core or support can be left in the ultimate body. Alternatively, the base can be removed by any conventional destructive or like removal technique. For example, it can be melted out, dissolved out or simply withdrawn by sliding it out of the synthetic-resin body.

The base thus can be removed prior to or subsequent to the impregnation of the reinforcing material with the liquid synthetic resin. When, for example, a roving coil is formed on the support in such fashion that it becomes self-supporting for the impregnating process by virtue of a sufficient strength and is thus capable of withstanding impregnation and the sheathing step, the core or support can be withdrawn immediately upon formation of the reinforcing body. As a consequence, only a limited number of these supports may be required for the production of a large number of reinforcing bodies of complex configuration.

Naturally, if the strength of the fiber coil itself is insufficient to resist the impregnation with the synthetic-resin material and the sheathing, the fiber coil is retained upon the support and, if the support is not desired in the finished body, it is removed subsequent to hardening of the synthetic-resin material. In this case, the support may be thin-walled plaster or gypsum or glass which can be broken away. The support may also be formed from a material such as a low-melting metal alloy, wax or the like which can be melted out of the synthetic-resin body. It may be also composed of a vaporizable foam synthetic-resin material which can be subjected to heating to decompose the support. Especially the latter method has been found to be advantageous and to be useful where the core becomes integrated in the outer form formed by the hardenable liquid. The core material may be composed of the same material as the sheath in which case all problems with different coefficients of expansion can be eliminated. When problems of different coefficients of thermal expansion arise, these may be alleviated by the use of graded materials to equalize the expansion characteristics.

According to an embodiment of the present invention, the reinforcing body after sheathing with the liquid and, generally, also after hardening of the latter is impregnated with the synthetic-resin material by the use of inlet and outlet openings. When the reinforcing body is large-pored or coarse-pored, it has been found to be advantageous prior to the application of the sheathing material to deposit upon the exterior of the reinforcement, a pore-closing coating in the form of a powder layer which prevents penetration of the sheathing metal into the reinforcing body interstices.

According to yet another feature of the invention, the reinforcing body, generally upon the aforementioned support, is immersed in a bath of the synthetic-resin material and is impregnated thereby. Surplus synthetic resin can be expressed from the body of reinforcing fibers by the sheathing liquid whereupon the impregnated body is hardened and the sheath removed. Preferably, before the reinforcing body is immersed in the bath, it is subjected to vacuum for a period of several minutes and, after immersion in the bath to a substantially higher pressure than ambient, for example, ten bars and higher, for an additional period of several minutes.

The vessel used for this purpose can be an autoclave. It should be noted that much lower pressures used in prior-art systems require far more expensive mold constructions.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
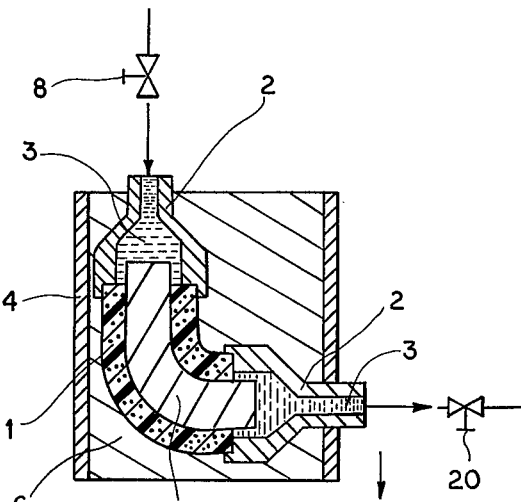
FIG. 1 is a schematic vertical section through an apparatus in accordance with the present invention showing the sheathing material solidified in a mold compartment.

The process (FIGS. 4–6) is carried in accordance with the present invention by initially degassing the vessel and all of its contents with a vacuum pump (not shown). Thereafter, the synthetic resin 3 is permitted to impregnate the reinforcing body. Advantageously a plurality of such bodies are disposed simultaneously in the vessel and can flow to all of these bodies through a common feed line. The vessel may be provided with a sight glass to permit observation of the level of liquid therein. For more effective penetration of the reinforcing body, superatmospheric pressure is generally applied until the synthetic-resin material has hardened or gelled.

The reinforcing body 1 is shown as a pipe fitting (right-angled or 90° elbow) which is provided at its ends with connecting pieces 2 of funnel-shaped configuration serving for the supply and withdrawal of the impregnating synthetic resin.

A rigid casting shell 4 receives the reinforcing body 1 and the latter is provided with a core or support 5 upon which the fibrous material is wound. The support 5 can be composed of solid, liquifiable or gasifiable material. The resin-impregnated body 1 is shown to be surrounded by a continuous sheath of solidified sheathing liquid, e.g. a low-melting metal of the type described.

Figure 2:
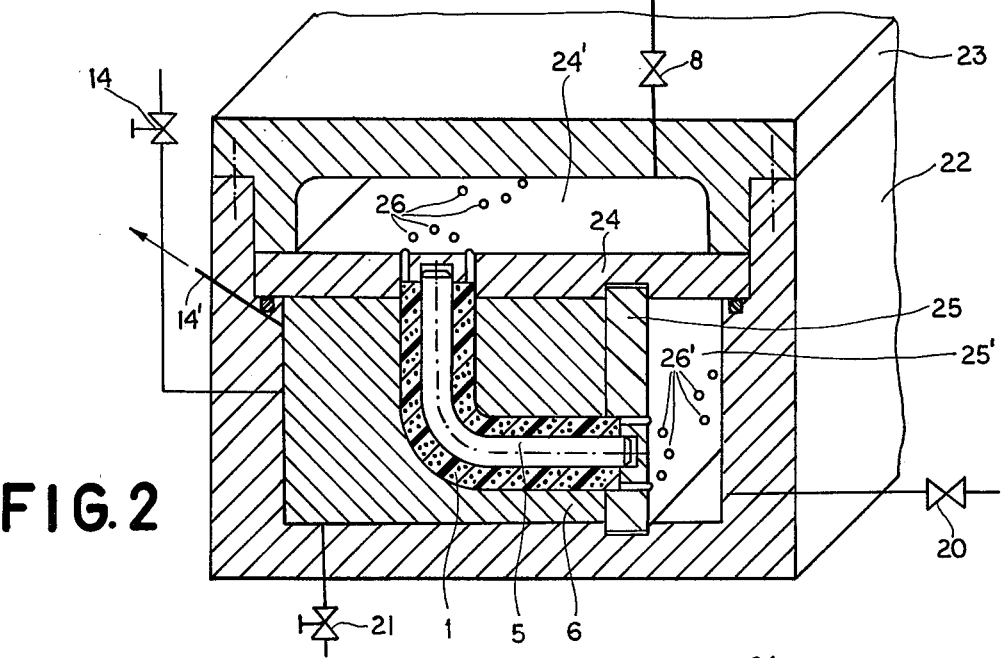
FIG. 2 is a schematic vertical section, partly in perspective form, through a closable receptacle provided with a carrier plate serving simultaneously as a spacer and which has feed openings for application of vacuum and pressure to the reinforcing body and for feeding synthetic resin to and removing excess synthetic resin from the latter body.
Figure 3:
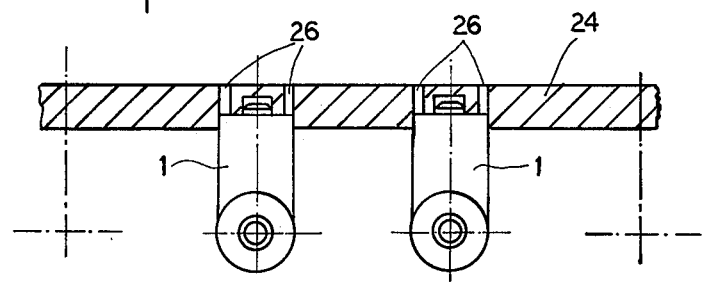
FIG. 3 is a cross-sectional view of a carrier plate illustrating two reinforcing bodies (pipe elbows with an angle of 90°) in front elevational view.

Reinforced synthetic-resin bodies can be made by the apparatus of FIGS. 2 and 3 as follows:

The invention in FIGS. 2 and 3 has been illustrated for the fabrication of an elbow or right-angle fitting. The body 1 composed of the reinforcing material, e.g. turns of glass-fiber roving, is initially set into the spacer plates 24 and 25, preferably together with a number of other items. These plates are provided with feed and discharge openings 26 and 26' which pass through the plates 24 and 24'.

Once the body is mounted in the plates 24 and 25, the plates are disposed in a vessel 22 and the latter is closed by a cover 23. The sheathing material is then introduced via a valve 14 into the vessel, the sheathing material being represented at 6.

Air within the vessel is driven out via a duct 14'.

The impregnating synthetic-resin material 3 is then supplied via valve 8 through the cover 23 and passes through the openings 26 in the plate 24 at the end face of the body 1 of reinforcing material. The synthetic resin thus impregnates the porous body and emerges via openings 26' in the plate 25. The impregnating material passes via the openings 26' into a chamber from which it is drained via the valve 20.

As soon as the impregnating material gels or hardens, the sheathing material 6, to the extent that it has been retained in a liquid state, can be withdrawn via the valve 21.

If the sheathing material has solidified, the solid mass of the sheathing material 6 together with the plates 24 and 25 and the hardened synthetic resin reinforced body is withdrawn from the vessel 22 and the sheathing material melted at a temperature below the temperature at which the synthetic-resin body is affected. The body is thereby freed.

The support 5 can be concurrently or subsequently melted out or otherwise withdrawn from the reinforced synthetic-resin body.

FIG. 3 shows that the carrier plate 24 can have two bodies 1 of reinforcing material afixed thereto. This is intended to illustrate the fact that each plate 24 can be used for the simultaneous formation of a multiplicity of bodies.

Figure 4:
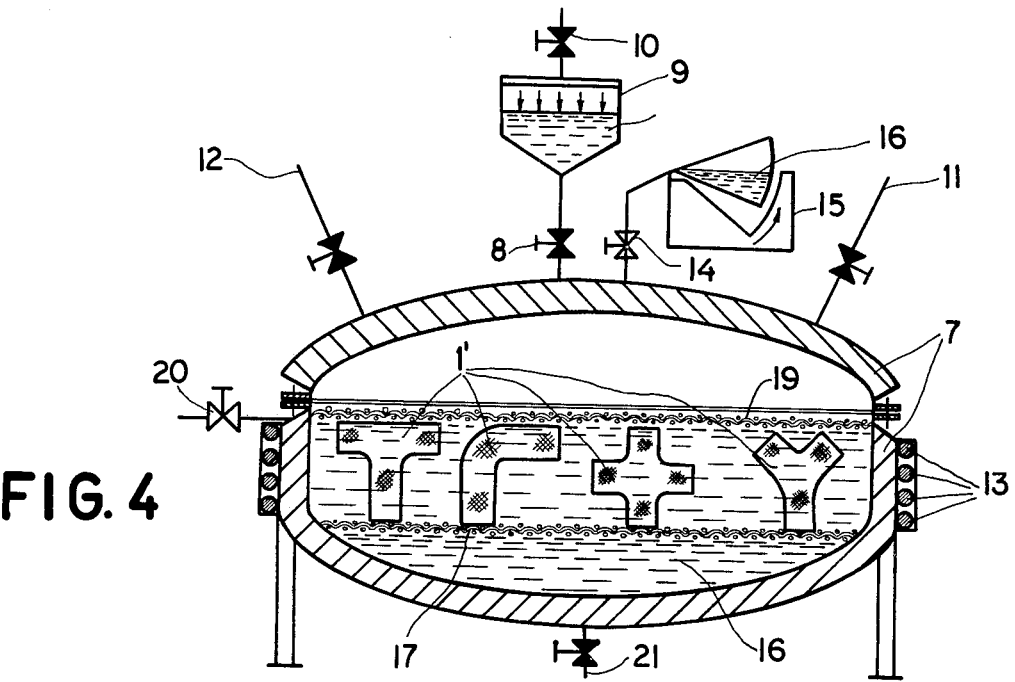
FIG. 4 is a diagrammatic vertical section through a controlled-temperature closable vessel, i.e. an autoclave, with the reinforcing bodies in place and subjected to sheathing with a liquid sheathing material.

In the embodiment of FIG. 4, the process is carried out as follows:

The reinforcing body 1' is positioned upon a grate 17 in a vacuum and pressure-tight vessel 7, e.g. an autoclave, and is covered by the grate 19.

After the vessel 7 is closed, the vacuum valve 12 is opened to apply suction to the interior of the vessel and degas the latter and the reinforcing bodies therein. When the desired subatmospheric level in the vessel is reached, the valve 12 is closed and the valve 8 is opened. The synthetic resin 3 in the hopper 9, which has previously been degased by evacuation through the valve 10, is then admitted to the vessel.

As the synthetic resin level rises in the vessel 7, it impregnates the reinforcing bodies 1' until the liquid synthetic-resin material reaches the level of the grate 19 or the synthetic resin discharge valve 20.

After closing of the valve 8, the pressure valve 11 is opened to subject the interior of the vessel to a superatmospheric pressure to ensure uniform pressure impregnation of the reinforcing bodies. This pressure is applied for a period of three to five minutes, whereupon the valve 11 is closed and the container 7 vented via the valve 20.

The valve 14 is then opened and molten metal 16 from the retort or vessel 15 is introduced. The synthetic resin in this vessel, to the extent that it has not already penetrated and impregnated the reinforcing bodies 1', is driven out by the molten metal via the valve 20. The grate 19 prevents the impregnated synthetic-resin bodies 1' from floating upward.

The molten metal 16 is permitted to rise to the height of the grate 19.

Upon closing of the valves 14 and 20, the hardening of the synthetic-resin impregnating material can commence, generally because of the sensible heat carried by the liquid metal 16 and by reason of the heating of the shell 13 of the vessel 7.

After hardening of the impregnating material, the liquid metal 16 is discharged via the valve 21 from the container 7. The container or receptacle 7 is then opened and the completed molded body is removed.

Figure 5:
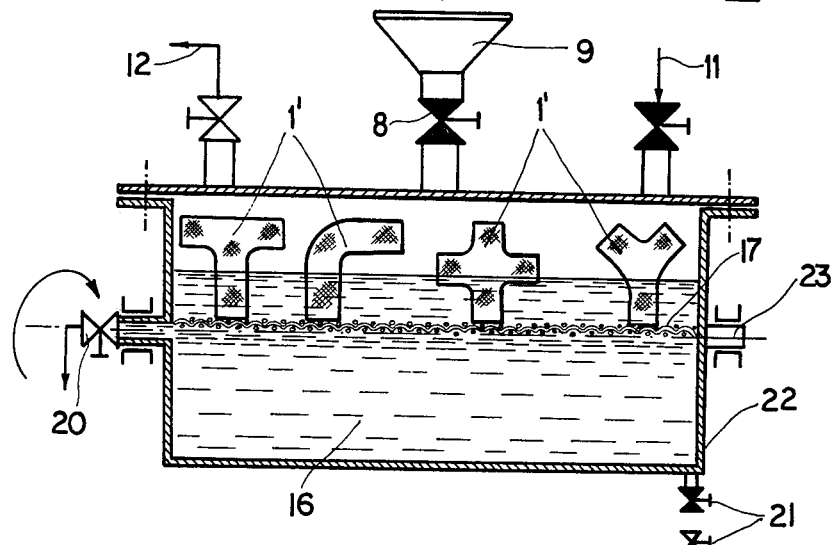
FIGS. 5 and 6 show, in longitudinal cross-section, a drum-type apparatus according to the invention in the starting position and rotated through 180°, respectively.

In the embodiment of FIG. 5, the closable vessel 22 is formed as a drum. This drum is rotatable about an axis 23 through about 180° C. The drum is also provided with a support grate 17 which extends longitudinally of the drum and hence parallel to its pivot axis.

The reinforcing bodies 1' are positioned upon the grate 17 or can be held there by posts, pins, hooks, projections or the like.

Beneath the support grate 17 there is provided a body of a low melting alloy 16. A subatmospheric line 12, a superatmospheric line 11 and a line for the supply of the hardenable synthetic resin from the feed vessel 9 are provided in the shell of the drum 22 at locations which are free from the metal 16.

This pipe can be closed by a valve 8.

Figure 6:
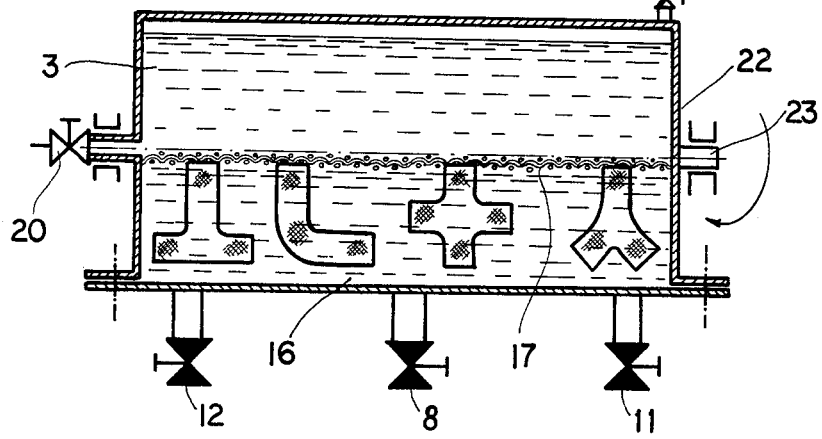

A further pipe 20 runs through the hollow shaft of the drum and is closable by a respective valve and is used, upon rotation of the drum from the position shown in FIG. 6 through 180°, to withdraw the synthetic resin and return it to the supply chamber 9.

The process of the invention, as practiced in the system of FIGS. 5 and 6, is as follows:

The drum 22 is first put into a position in which the sheathing liquid 16 lies below the support grate 17 (FIG. 5).

The bodies 1' are then introduced through openings in the drum and are placed upon the grate 17. The drum is then closed and pipe 12 is opened via a suitable valve to connect the interior of the drum to a suction or vacuum source, thereby withdrawing air from the interior of the drum and from the bodies 1'. After this degasing step, the subatmospheric pressure pipe 12 is closed.

Valve 8 is then opened to admit synthetic resin from the supply 9 into the drum. The synthetic-resin material covers the bodies 1' until the level of the synthetic-resin material lies above the top of the highest body 1' positioned upon the grate.

At this point, valve 8 is closed and superatmospheric pressure is applied to the interior of the vessel via pipe 11. The synthetic-resin material is thus forced strongly into the interstices of the reinforcing material which is thereby penetrated substantially completely by the synthetic-resin material. The superatmospheric pressure line 11 is then closed and the drum 22 is rotated through 180° from the position shown in FIG. 5 to the position shown in FIG. 6.

As a result of the rotation of the drum, the bodies 1' lie below but float to the grate 17 and the synthetic-resin material is expressed from the drum 22 except for that material which has penetrated the bodies 1', by the liquid metal 16 which has a substantially higher density. The synthetic resin is thus driven out via the line 20 and can be returned to the vessel 9 for the synthetic resin.

The bodies impregnated with the synthetic-resin material are then surrounded by the material 16 of higher density and the synthetic resin can be hardened and solidified, preferably by the addition of heat, e.g. by subjecting the drum to ultraviolet radiation, to microwave energy or the like. As soon as the synthetic resin material hardens or reaches a gelled state, the drum 22 is rotated again to the position shown in FIG. 5. The material 16 of higher density than the synthetic resin thus flows through the grate 17 and lies below it to leave the bodies 1' completely free from the sheathing material. The bodies 1' can then be removed from the grate and the drum 22.

The drum 22 according to FIGS. 5 and 6 is provided with a dual-function valve 21. In the position shown in FIG. 6, this valve serves to vent the interior of the drum during the discharge of the synthetic-resin material therefrom. In the position shown in FIG. 5, it enables the removal of the liquid sheathing material.

I claim:
1. A method of making a shaped article of reinforced synthetic-resin material, comprising the steps of:
   (a) impregnating a body of reinforcing material having given shape and dimensions with a hardenable synthetic resin to form an impregnated body of said shape and dimensions;
   (b) completely surrounding the impregnated body with a form-defining liquid material of higher density than the synthetic-resin while the synthetic-resin impregnating said body is in a flowable state, said material being nonmiscible with the synthetic-resin;
   (c) solidifying said synthetic-resin in said body while the latter is surrounded by the material of said liquid; and
   (d) removing the material of said liquid from the body after the solidification of said synthetic-resin.

2. The method defined in claim 1 wherein said body of reinforcing materal is impregnated with said hardenable synthetic-resin prior to surrounding the body with said form-defining liquid.

3. The method defined in claim 1 wherein the body of reinforcing material is impregnated with said hardenable synthetic-resin subsequent to surrounding said body with said liquid material.

4. The method defined in claim 1 wherein said body is surrounded by said liquid continuously and without any cracks in the surrounding material.

5. The method defined in claim 1 wherein said liquid material is a low melting metal alloy and is solidified around said body, step (c) being carried out upon solidification of the liquid material.

6. The method defined in claim 1 wherein said body of reinforcing material is formed on a support, said support being removed from said body prior to impregnation thereof with said hardenable synthetic-resin and the surrounding of the body with said liquid material.

7. The method defined in claim 1 wherein said body of reinforcing material is formed on said support and said body is impregnated on said support with said hardenable synthetic-resin.

8. The method defined in claim 1 wherein the impregnation of said body of reinforcing material is carried out by first subjecting said body to a subatmospheric pressure and then subjecting said hardenable synthetic-resin in said body to a subatmospheric pressure.

9. The method defined in claim 1 wherein said body of reinforcing material is surrounded with the liquid material and the liquid material is thereafter solidified leaving passages therein for supplying the impregnating synthetic-resin to said body.

10. The method defined in claim 1 wherein said body is carried by a support and is immersed in a bath of the synthetic-resin to impregnate said body therewith in step (a), surplus synthetic-resin being displaced from said body with said liquid material.

11. The method defined in claim 7 wherein said support is composed of the same material as said liquid.

12. The method defined in claim 11 wherein said body is provided, prior to step (b) with a pore-closing coating.

* * * * *